(12) United States Patent
Brandl et al.

(10) Patent No.: US 9,846,832 B2
(45) Date of Patent: Dec. 19, 2017

(54) SERIALIZATION OF RFID TAGS

(75) Inventors: Roland Brandl, Eggersdorf bei Graz (AT); Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 1194 days.

(21) Appl. No.: 13/495,126

(22) Filed: Jun. 13, 2012

(65) Prior Publication Data

US 2013/0335202 A1   Dec. 19, 2013

(51) Int. Cl.
*G06K 7/01* (2006.01)
*G06K 19/077* (2006.01)

(52) U.S. Cl.
CPC .............. *G06K 19/07749* (2013.01)

(58) Field of Classification Search
CPC ......... G06K 19/07749; G06K 7/10009; G06K 19/0725; G06K 19/08; G06K 19/07309; G06K 2017/0051
USPC ..... 340/10.1, 10.2, 10.3, 10.4, 10.41, 10.42, 340/572.1
See application file for complete search history.

(56) References Cited

U.S. PATENT DOCUMENTS

| 8,228,175 | B1* | 7/2012 | Diorio et al. | 340/10.51 |
| 2008/0041944 | A1 | 2/2008 | Rowe | |
| 2009/0201136 | A1 | 8/2009 | Itagaki | |

FOREIGN PATENT DOCUMENTS

| CN | 1711564 A | 12/2005 |
| EP | 2339503 | 6/2011 |

OTHER PUBLICATIONS

Monza 5 Tag Chip Datasheet 2011 pp. 1-14.*
EPC-enabled RFID Serialization Management for SGTIN-96 May 9, 2012.*
Alien_Higgs™ 4 IC Serialization May 14, 2012.*
"Extended European Search Report for EP 13171598 dated Oct. 16, 2013".

* cited by examiner

*Primary Examiner* — Nabil Syed

(57) ABSTRACT

Various exemplary embodiments relate to a method performed by an RFID tag, the method including: receiving a request for a EPC serial number; determining whether the EPC serial number has a preset value; when the EPC serial number has the preset value, mapping a transponder ID to the EPC serial number; and providing the EPC serial number in response to the RFID read request.

16 Claims, 4 Drawing Sheets

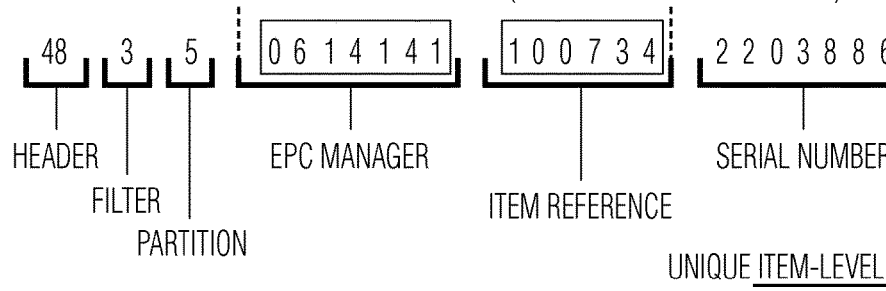
FIG. 1
| HEADER | FILTER/<br>OBJECT TYPE | PARTITION | COMPANY<br>PREFIX | ITEM REF AND<br>INDICATOR | SERIAL |
|---|---|---|---|---|---|
| 8 BITS | 3 BITS | 3 BITS | 20-40 BITS | 24-4 BITS | 38 BITS |
FIG. 2

SERIALIZATION OF RFID TAGS

TECHNICAL FIELD

Various exemplary embodiments disclosed herein relate generally to RFID tags and systems.

BACKGROUND

RFID tags have become widely used to tags items. The RFID tags can be used to track items, to help maintain inventory, and to determine the location of an item at any given time. An RFID tag may include a unique electronic product code (EPC) serial number to help uniquely identify an RFID tag and thus its associated item.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method performed by an RFID tag, the method including: receiving a read request for a EPC serial number; determining whether the EPC serial number has a preset value; when the EPC serial number has the preset value, mapping a transponder ID to the EPC serial number; and providing the EPC serial number in response to the RFID read request.

Various exemplary embodiments relate to an RFID tag, including: an analog RF interface configured to receive a read request for an EPC serial number and providing the EPC serial number in response to the RFID read request; a digital controller configured to map a tag ID serial number into the EPC serial number; and a memory configured to store an EPC serial number and a tag ID serial number.

Various exemplary embodiments relate to an RFID system, including: an RFID tag further including: an analog RF interface configured to receive a request for an EPC serial number and providing the EPC serial number in response to the RFID request; a digital controller configured to map a tag ID serial number into the EPC serial number; and a memory configured to store an EPC serial number and a tag ID serial number; and an RFID reader configured to communicate with the RFID tag.

BRIEF DESCRIPTION OF THE DRAWINGS

In order to better understand various exemplary embodiments, reference is made to the accompanying drawings, wherein:

FIG. 1 illustrates a universal product code (UPC) bar code and an electronic product code (EPC);

FIG. 2 illustrates a data structure for the EPC;

To facilitate understanding, identical reference numerals have been used to designate elements having substantially the same or similar structure and/or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

FIG. 1 illustrates a universal product code (UPC) bar code and an electronic product code (EPC). A UPC provides visible object-level information. The UPC may include a company prefix and item reference number. The company prefix indicates the company the produced the product carrying the UPC. The item reference number indicates the company item number for the product carrying the UPC. For example, the company prefix may indicate that ACME Corporation produced the product associated with the UPC. The item number may indicate that the item is a WIDGET.

High volume RFID applications mainly use an EPC data structure on the RFID tag. The EPC is similar to the UPC but adds a serial number to provide unique item-level information. A typical example of an EPC is the serialized global trade item number (SGTIN 96) that may include 96 bits, where 38 bits of this code may be a unique serial number.

FIG. 2 illustrates a data structure for the EPC 96. EPC 96 includes a header of 8 bits. EPC 96 includes a filter/object type field of 3 bits. Next, EPC 96 includes a partition field of 3 bits. A company prefix field may be 20-40 bits long. The item reference and indicator field may be 24-4 bits long. Accordingly, the company prefix and item reference and indicator field combined are 44 bits. The final field in the EPC 96 is the serial number of 38 bits.

Figure 3:
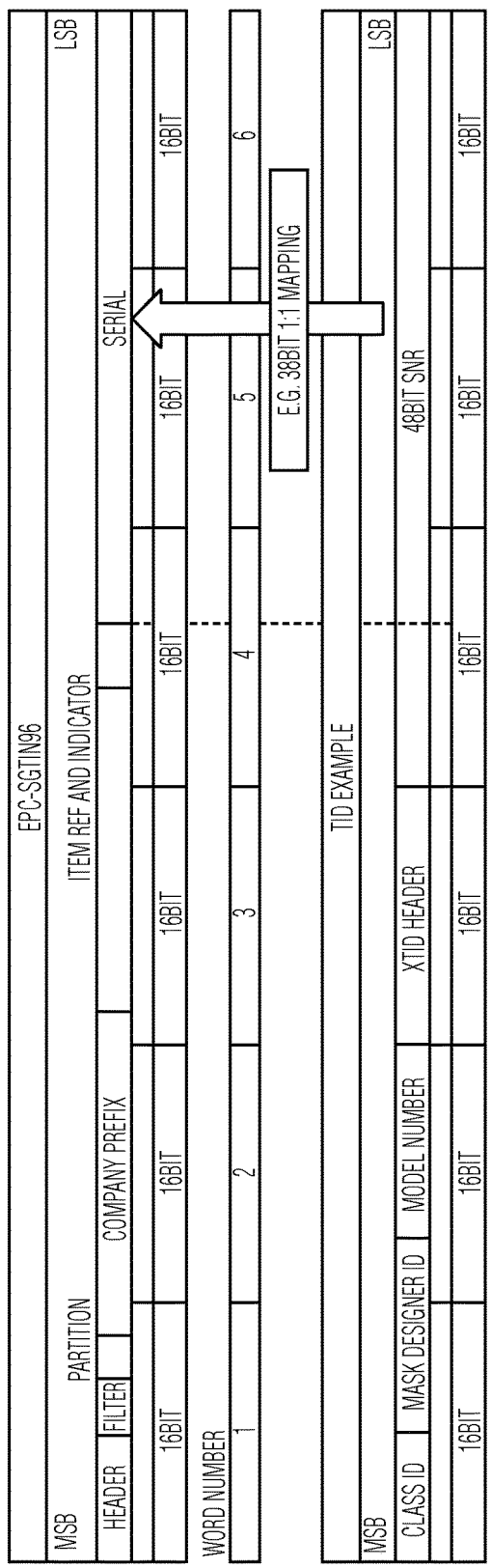
FIG. 3 illustrates a comparison between the EPC and a tag identifier (TID)

FIG. 3 illustrates a comparison between the EPC and a tag identifier (TID). An example TID is shown that is 96 bits long. The example TID may include a class ID, mask designer ID, model number, XTID header, and serial number. The combined class ID, mask designer ID, and model number may be 32 bits long. The XTID header may be 16 bits long. The serial number may be 48 bits long. The TID is information that may be programmed into the RFID tag by the manufacturer of the RFID tag. Accordingly, the TID serial number may be unique for all RFID tags.

In applications where a serial number is necessary for the RFID tag for unique identification of the tag, and hence an associated tagged item, the user of the RFID tag may write a serial number into the serial number field of the EPC. This takes time and additional effort on the part of the user, especially when thousands of RFID tags may be deployed by a user. Further, producing, storing, and tracking unique serial numbers for RFID tags takes effort as well. One solution has been to copy the TID serial number or some portion thereof into the EPC serial number. Again, this takes time and adds complexity during the programming of the RFID tag.

A solution to this problem is to map the TID serial number to the EPC serial number. This may be done for example by the user setting the EPC serial number to a preset value. For example, the preset value may be 0, which for many types of memory and circuitry is the default value, thus no write action during programming for the RFID tag may be needed by the user. The use of a preset value of 0 has other benefits. For example, if a user decides to write their own serial number, then no erase step may be needed because all of the bits are already set to 0 and may be written to. If another preset value is used, then each bit would have to be erased, or set to 0, prior to writing. Another potential preset value would be to set all of the bits of the serial number to 1. Further, any other beneficial preset value may be used as well.

In use, when the RFID tag is queried for its serial number, the RFID tag checks the EPC serial number. If the EPC serial number is the preset value, then the RFID maps the TID serial number, or portions of it, to the EPC serial number and responds to the query with the mapped TID serial number. If the EPC serial number is not the preset value, then the RFID tag may just respond to the query with the EPC serial number stored by the user.

Such an arrangement allows the user to default to mapping the TID serial number to the EPC serial number without any action during the programming of the RFID tag. Also, if the user does desire to produce and write serial numbers to the RFID tag, it may still do so.

As demonstrated in the example above in FIG. 3, the TID serial number may be 48 bits long, while the EPC serial number may be 38 bits long. The mapping may account for such a difference. For, example the mapping may include simply taking the 38 least significant bits of the TID serial number as the EPC serial number. Any other 38 bits in any order from the TID serial number may be used as well. Further, a selection of the 38 bits from the TID may also have a constant added, or be inverted, reversed in order, or modified in any other repeatable way. The mapping may also include the use of a hash function on 38 or more of the TID bits resulting in an output of 38 bits. Of course, any number of different functions may be used. Further, any number of bits may be used as well based upon the specific implementation found in the RFID tag.

If the mapping of the TID serial number into the EPC serial number requires any significant computation, such computation may be done at the time of the manufacture or programming and the result stored in another memory. In this embodiment, the mapping would obtain the EPC serial number from the memory storing the mapped TID serial number.

While the above description includes the use of EPC and TID, it is not intended that these terms be limited to the above examples or any specific standard or specification. The EPC may include a serial number that may be programmed by the user or mapped to the TID if the EPC has the preset value. The EPC serial number may unique to the specific user of and/or item associated with the RFID tag. The TID may include a serial number for the RFID tag that may be set by the manufacturer. This serial number may uniquely identify all RFID tags for a specific manufacturer.

Figure 4:
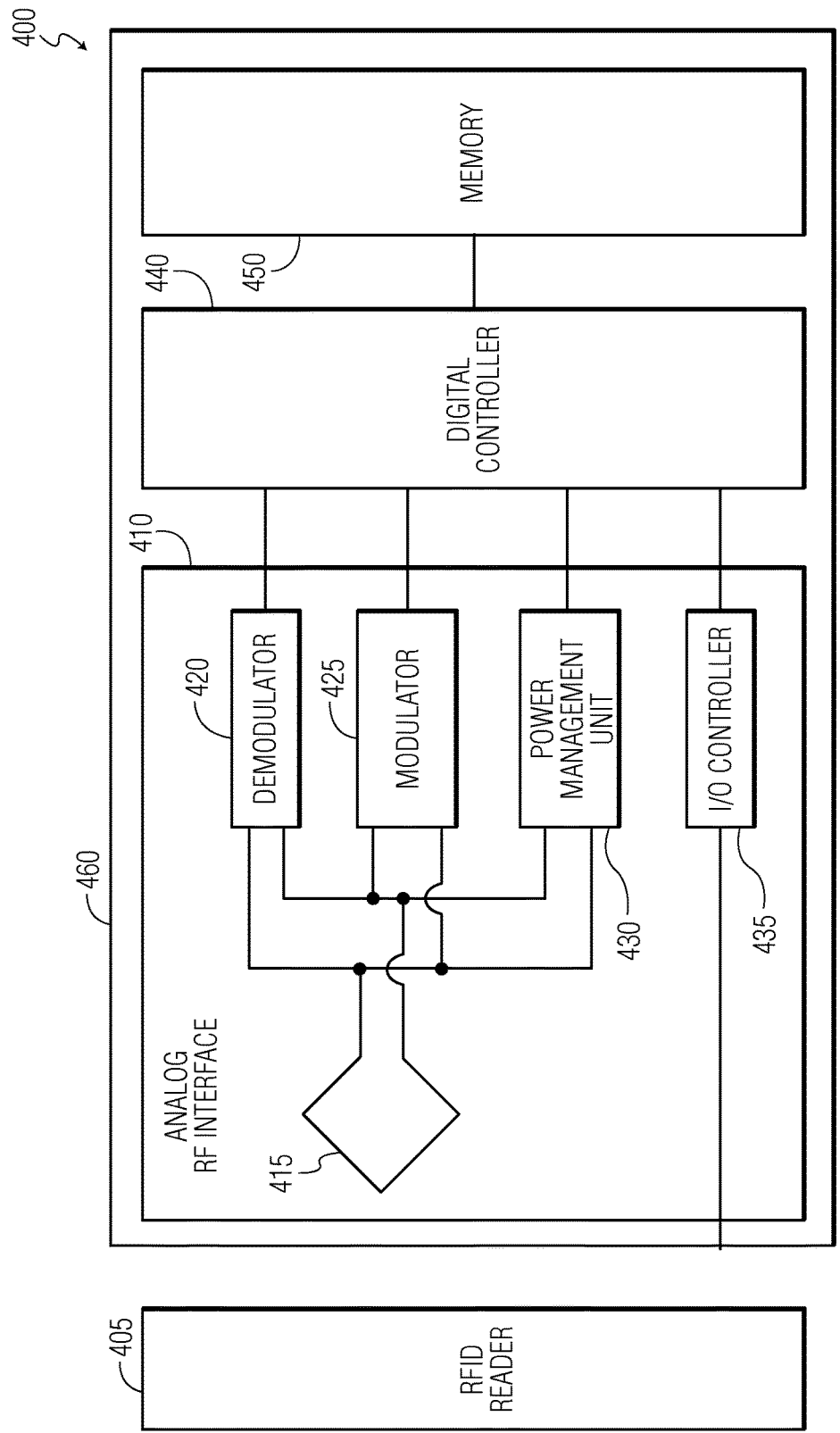
FIG. 4 is a block diagram illustrating an embodiment of and RFID system including an RFID tag.

FIG. 4 is a block diagram illustrating an embodiment of an RFID system including an RFID tag. The RFID system 400 may include an RFID reader 405 and an RFID tag 460. The RFID reader 405 may communicate with the RFID tag 460 in order to receive information from the RFID tag 460, specifically identification information.

The RFID tag 460 may include an analog RF interface 410, a digital controller 440, and memory 450. The analog RF interface may include an antenna 415, a demodulator 420, a modulator 425, a power management unit 430, and an I/O controller 435. The antenna may transmit and receive RF signals used to communicate with the RFID tag 460. Such RF signals may be received from and transmitted to the RFID reader 405. The demodulator 420 may receive and demodulate an input RF signal from the antenna 415. The demodulator 420 may provide a signal or data demodulated from the RF signal to the digital controller 440. The modulator 425 may receive a signal or data from the digital controller 440 and modulate the signal or data into an RF signal. The modulator may transmit the RF signal to the antenna 415. The power management unit 430 may control the power usage of various components in the RFID tag 460. Finally, the I/O controller 435 may send and receive data to/from outside the RFID tag 460 and provide that data to the digital controller 440.

The digital controller 440 may provide digital control of the various elements of the RFID tag 460. Typically, the digital controller 440 may be implemented as dedicated hardwired state machine logic to carry out the functions of the RFID tag 460. This may lead to the simplest and lowest cost design. The digital controller 440 may also be a programmable controller or processor as well that includes programming instructions that carry out the functions of the RFID tag 460.

The memory 450 stores data for the RFID tag 460. The memory may include an area that stores the TID and an area that stores the EPC. Further, the memory may have an area to store a copy of a mapped TID serial number that may be mapped into the EPC serial number. While shown as a single memory, the various memories may also be separate memories for the EPC, TID, and mapped TID serial number.

Figure 5:
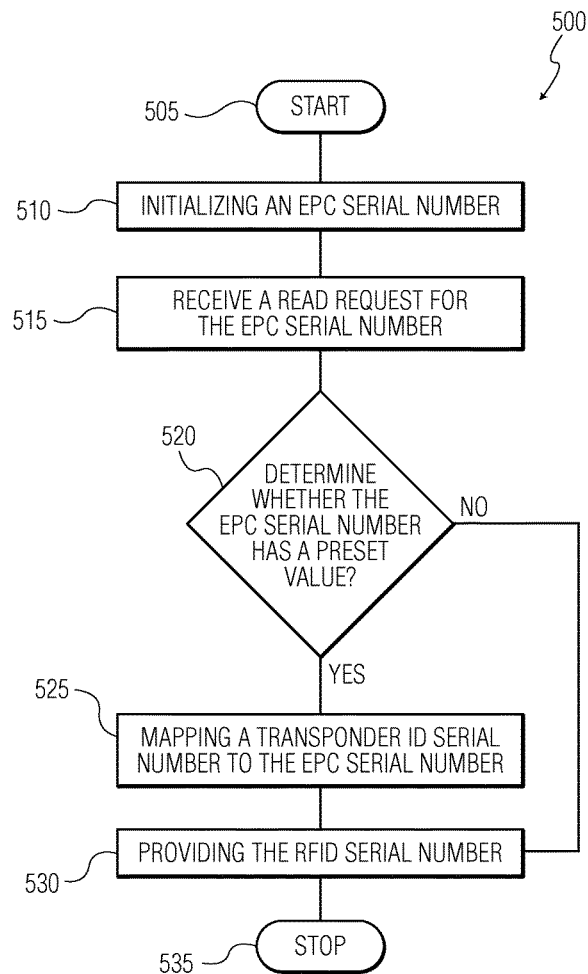
FIG. 5 is a flow diagram showing the operation of an RFID tag.

FIG. 5 is a flow diagram showing the operation of an RFID tag. The method of FIG. 5 may be carried out by the RFID tag in cooperation with a user or a RFID tag programming system. The method may begin by initializing an EPC serial number 510. This may include using a preset value or a user specified value. If the user supplies an EPC serial number, it will be unique to the user and the specific type of item tagged. Next, the method 500 may receive a request for the EPC serial number 515. Such a request may be made by an RFID reader. Then the method 500 determines whether the EPC serial number has a preset value 520. If so, then the method 500 may map the transponder ID serial number to the EPC serial number 525. Next, the method 500 provides the EPC serial number to the requestor 530. If the EPC serial number is not the same as the preset value 520, then the method 500 proceeds to providing the EPC serial number to the requestor 530. Then the method ends 535.

Various elements of the RFID tag 500 may carry out the steps of method 500. Such elements may include the demodulator 520, the modulator 525, the digital controller 540, and the memory 550.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by an RFID tag, the method comprising:
   receiving, in an analog RF interface, a RFID request for an EPC serial number;
   determining, in a digital controller, whether the EPC serial number has a preset value;
   when the EPC serial number has the preset value, mapping, in the digital controller, a tag ID serial number to the EPC serial number by copying at least a portion of the tag ID serial number into the EPC serial number and providing the EPC serial number in response to the RFID request; and
   when the EPC serial number does not have the preset value, providing a stored EPC serial number from a memory in response to the RFID request.

2. The method of claim 1, wherein mapping the portion of the tag ID to the EPC serial number further comprises:
   taking a number of least significant bits of the tag ID, wherein the number of least significant bits is a number of bits of the EPC serial number.

3. The method of claim 1, wherein mapping the portion of the tag ID to the EPC serial number further comprises:
   applying a function to the tag ID that results in the EPC serial number.

4. The method of claim 3, wherein the function is one of a hash function, an inverting function, rearranging of the bits, and adding a constant.

5. The method of claim 1, further comprising:
   programming the RFID tag including setting the EPC serial number to the preset value.

6. The method of claim 1, further comprising:
   programming the RFID tag including setting the EPC serial number to a value other than the preset value.

7. The method of claim 1, wherein mapping the portion of the tag ID to the EPC serial number further comprises:
   pre-computing the mapped EPC serial number from the tag ID serial number; and
   storing the pre-computed mapped EPC serial number in the memory; and wherein providing the EPC serial number in response to the RFID request, further comprises:
   providing the pre-computed mapped EPC serial number from the memory.

8. A non-transitory program storage device readable by a machine, tangibly embodying a program of instructions executable by the machine to perform the method of claim 1.

9. A non-transitory program storage device readable by a machine, tangibly embodying a program of instructions executable by the machine to perform the method of claim 2.

10. A non-transitory program storage device readable by a machine, tangibly embodying a program of instructions executable by the machine to perform the method of claim 3.

11. An RFID tag, comprising:
    an analog RF interface configured to receive a RFID request for an EPC serial number and providing the EPC serial number in response to the RFID request;
    a digital controller configured to determine whether the EPC serial number has a preset value map a tag ID serial number to the EPC serial number by copying at least a portion of the tag ID serial number into the EPC serial number when the EPC serial number has a preset value and provide a stored EPC serial number when the EPC serial number does not have the preset value; and
    a memory configured to store the EPC serial number and the tag ID serial number.

12. The RFID tag of claim 11, wherein mapping the portion of the tag ID to the EPC serial number further comprises:
    taking a number of least significant bits of the tag ID, wherein the number of least significant bits is a number of bits of the EPC serial number.

13. The RFID tag of claim 11, wherein mapping the portion of the tag ID to the EPC serial number further comprises:
    applying a function to the tag ID that results in the EPC serial number.

14. The RFID tag of claim 13, wherein the function is one of a hash function, an inverting function, rearranging of the bits, and adding a constant.

15. The RFID tag of claim 11, wherein mapping a portion of the tag ID to the EPC serial number, further comprises:
    pre-computing the mapped EPC serial number from the tag ID serial number; and
    storing the pre-computed mapped EPC serial number in the memory; and wherein providing the EPC serial number in response to the RFID request, further comprises:
    providing the pre-computed mapped EPC serial number from the memory.

16. An RFID system, comprising:
    an RFID tag comprising an analog RF interface configured to receive a RFID request for an EPC serial number and providing the EPC serial number in response to the RFID request, a digital controller configured to determine whether the EPC serial number has a preset value, map the tag ID serial number to the EPC serial number by copying at least a portion of the tag ID serial number into the EPC serial number when the EPC serial number has a preset value and provide a stored EPC serial number when the EPC serial number does not have the preset value, and a memory configured to store the EPC serial number and the tag ID serial number; and an RFID reader configured to communicate with the RFID tag.

* * * * *